March 27, 1945.　　　R. H. ENGELHARDT　　　2,372,477
SCAVENGING AIR VALVE ENGINE
Filed Sept. 24, 1943　　　2 Sheets-Sheet 1

Robert H. Engelhardt
INVENTOR.

WITNESSES:

BY
Victor J. Evans & Co.
ATTORNEYS

March 27, 1945.  R. H. ENGELHARDT  2,372,477
SCAVENGING AIR VALVE ENGINE
Filed Sept. 24, 1943   2 Sheets-Sheet 2
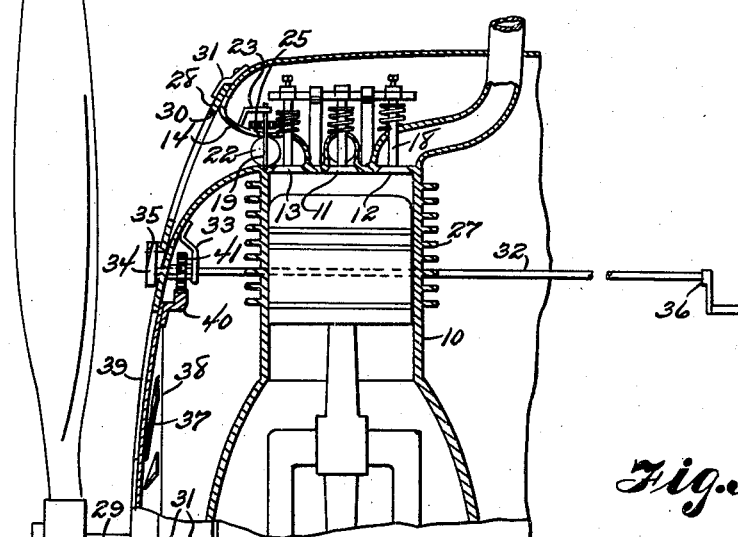
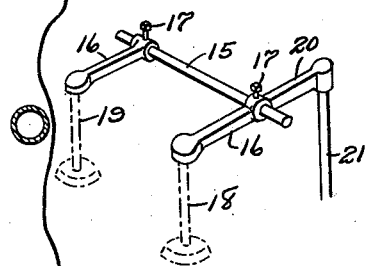
Robert H. Engelhardt
INVENTOR.
BY
Victor J. Evans & Co.
ATTORNEYS
WITNESSES:

Patented Mar. 27, 1945

2,372,477

UNITED STATES PATENT OFFICE 2,372,477

SCAVENGING AIR VALVE ENGINE

Robert H. Engelhardt, Fort Benning, Ga.

Application September 24, 1943, Serial No. 503,692

7 Claims. (Cl. 123—76)

This invention relates to a scavenging air valve engine and has for an object to provide an engine in which each cylinder is provided with an intake valve, an exhaust valve, and a scavenging air valve, the latter valve opening at about the same time the exhaust valve opens so that air is forced into the cylinder to cool the cylinder from the inside and to purge the spent gases.

A further object is to provide an engine of this type, which may be completely cowled excepting for air scoops leading to the scavenging air valves, there being thermostat valves in the scoops to regulate the flow of air to the cylinders.

A further object is to provide an engine of this type, in which means are provided for closing the air scoops and opening slot openings in the cowl, in case of rain, so that the cooling fins of the cylinder will be in contact with air admitted through the slot openings.

A further object is to provide a device of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming a part of this specification:

Figure 2 is a side elevation, with parts in section and parts removed, of the engine shown in Figure 1.

Figure 3 is a detail perspective view showing the mechanism for opening the scavenging valve and the exhaust valve at the same time.

Figure 4 is a detail perspective view of the thermostat valve.

Figure 1:
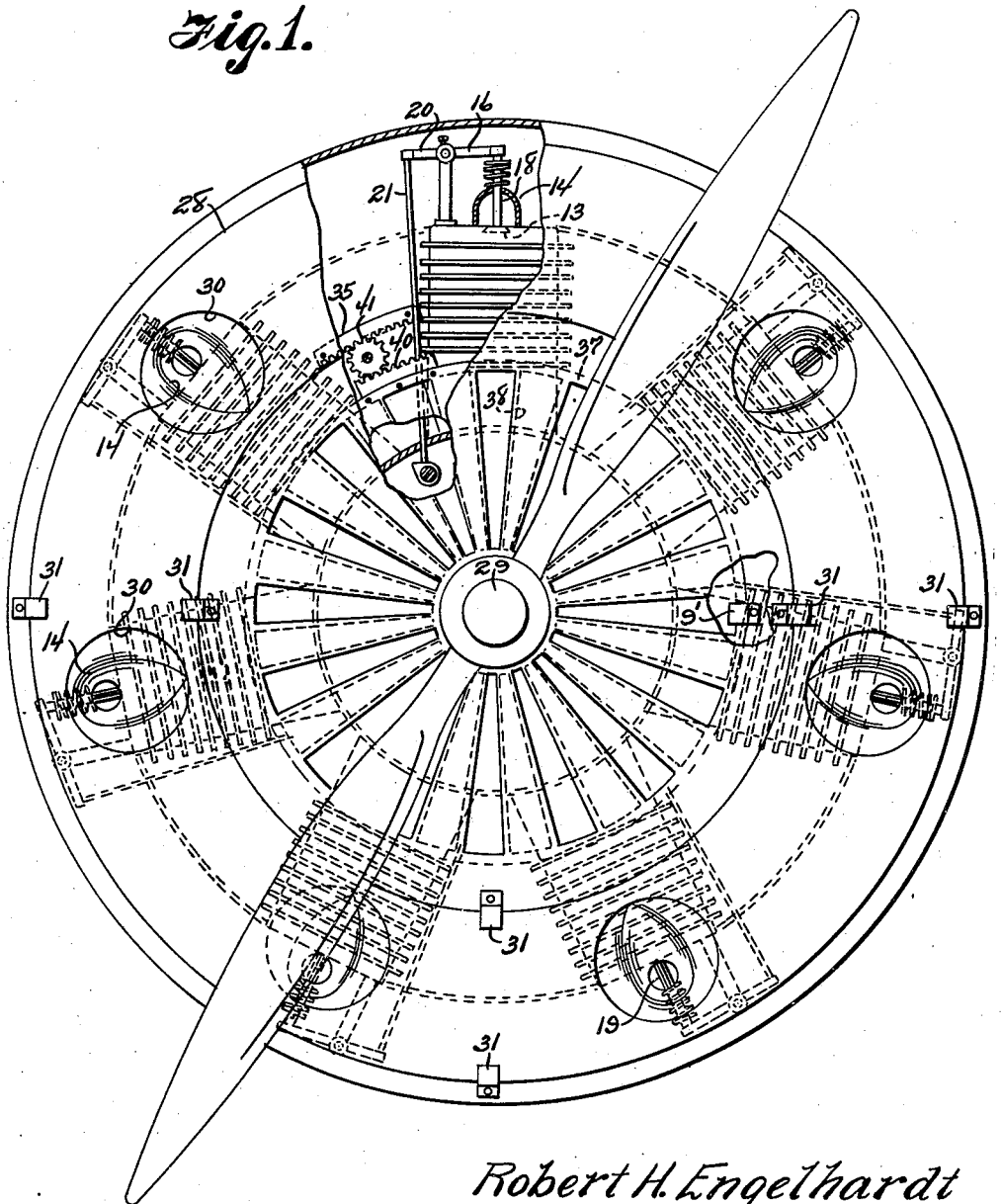
Figure 1 is a front elevation with parts removed and parts broken away, of a scavenging air valve engine constructed in accordance with the invention.

Referring now to the drawings in which like characters of reference designate similar parts in the various views, 10 designates an airplane engine of the radial type. In carrying out the invention, each cylinder 11 has a fuel intake valve 11, and exhaust valve 12 of conventional type, and in addition thereto is provided with a scavenging air valve 13, similar to the fuel and exhaust valve and adapted to open at the same time the exhaust valve opens, for the purpose of supplying air through an air scoop 14 formed in the cowl 9, to cool the cylinder from the inside and purge the cylinder of spent gases.

For simultaneously operating the valve 13 and the exhaust valve 12, a rocker arm 15 is provided with arms 16, fixed thereto by set screw 17, the free ends of the arms being adapted to engage the stems 18 and 19 of the exhaust valve and valve 13, see Figure 3, to open the valves against the pressure of their controlling springs. The rocker arm is actuated, as is usual, by a crank 20 connected to the upper end of a push rod 21, which is operated from the usual cam shaft of the engine.

For closing each air scoop until the engine has warmed up to a pre-determined extent, a thermostat valve 22 is mounted in each air scoop through the medium of a bracket 23. The stem 24 of the thermostat valve, see Figure 4, is provided with a conventional spiral thermostat 25, which is fixed at one end to the valve stem and at the other end is anchored stationary by a pin 26 fixed stationary. The thermostat, as the motor warms up to operating condition, turns the valve stem and opens the valve.

In the event of rain, it is desirable that the air scoops be closed so that water cannot enter the cylinders, but at the same time air cooling is necessary through the medium of the fins 27 of each cylinder. For closing the air scoops, an annular valve 28 is mounted concentrically with the shaft 29 of the engine and is disposed on the front face of the cowl. The annular valve is provided with the plurality of concentrically disposed openings 30, which are adapted to register with the air scoops when the valve is turned in one direction relatively to its securing brackets 31, and adapted to blank, or seal the air scoops when the valve is turned in the opposite direction. For actuating the scoop control valve 28 a shaft 32 is mounted on a bracket 33 secured to the inner face of the cowl, and is equipped with gear 34 disposed outside of the cowl adapted to engage a toothed segment 35 fixed to the annular valve 28. The shaft may extend back into the cockpit and is there equipped with a crank handle 36 for turning the shaft to rotate the annular valve in either direction through the medium of the gear 34 and the toothed segment 35.

When the annular valve 28 is turned to seal the air scoops, the engine is cooled through the medium of a disc valve 37 disposed on the inner face of the cowl concentric with the shaft 29 and provided with a plurality of radial slots 38 adapted to be brought into or out of register with radial slots 39 in the cowl when the cowl 9 disc valve is rotated.

For rotating the disc valve, which is mounted in angular brackets 9, a toothed segment 40 is secured to the disc valve and meshes with a gear 41 on the shaft 32. The slots 38 of the disc valve are so arranged relatively to the openings 30 of the annular valve that when the shaft 32 is turned in one direction the annular valve will close the air scoops and at the same time the disc valve will register its slots 38 with the slots 39 in the cowl to admit air to the fins 27 of each cylinder for cooling the cylinder. This is done in case of rain. The reverse movement of the shaft 32 causes the annular valve to open the air scoops and causes the disc valve to close the air slots in the cowl. This is done for normal operating conditions.

In connection with marine and automotive vehicle engines and the like, air may be forced into the cylinders by a blower or other suitable device.

From the above description, it is thought that the invention will be fully understood, without further explanation.

What is claimed is:

1. An internal combustion engine comprising a cylinder, a fuel intake valve and an exhaust valve in the cylinder, an air valve in the cylinder, a cowl for the engine, an air scoop opening through the cowl and communicating with the air valve, means timing the air valve to open approximately at the same time the exhaust valve opens to permit cooling air being forced through the air scoop into the cylinder to cool the cylinder from the inside and purge spent gases from the cylinder, a thermostat valve in the air scoop adapted to remain closed until the engine is warmed up to operating condition, a manually operable valve for closing the air scoop to prevent access of rain to the cylinder, and means for permitting access of cooling air to the exterior of the cylinder when the valve in the air scoop is closed.

2. The structure as of claim 1, and in which the thermostat valve comprises a valve mounted in the air scoop and having a valve stem, and a spiral thermostat connected at the inner end to the valve stem and anchored stationary at the outer end in the air scoop.

3. The structure as of claim 1, and in which the manually operable means for closing the air scoop comprises a valve having an opening adapted to be brought into register with the air scoop to unseal the air scoop and to be brought out of register with the air scoop to close the air scoop, means for mounting the valve on the cowl and motion transmitted means connected to the valve for turning the valve.

4. The structure as of claim 1, and in which the means for permitting access of cooling air to the exterior of the cylinder comprises slots formed in the cowl, a rotatable valve mounted on the cowl having slots adapted to be brought into register or out of register with the slots of the cowl when the valve is turned, and means for turning the valve.

5. The structure as of claim 1, and in which a manually rotatable gear and toothed segments meshed with the gear co-ordinate the closing of the manually operable valve on the air scoop with the opening of the means for permitting access of cooling air to the exterior of the cylinder.

6. The structure as of claim 1, and in which the means for timing the air valve comprises a rock shaft, arms on the rock shaft adapted to open the air valve and the exhaust valve at approximately the same time, a crank arm on the rock shaft, and a cam operated push rod engaging the crank arm.

7. An internal combustion engine, comprising a cylinder, a fuel intake valve and an exhaust valve in the cylinder, an air valve in the cylinder, an air scoop communicating with the air valve, means timing the air valve to open at approximately the same time the exhaust valve opens to permit cooling air being forced through the air scoop into the cylinder to cool the cylinder from the inside and purge spent gases from the cylinder, a valve in the air scoop, means for closing the valve until the engine is warmed up to operating condition, a valve for closing the air scoop to prevent access of rain to the cylinder, and means for permitting access of cooling air to the exterior of the cylinder when the valve in the air scoop is closed.

ROBERT H. ENGELHARDT.